United States Patent
Conrad et al.

(12)

(10) Patent No.: US 6,245,697 B1
(45) Date of Patent: Jun. 12, 2001

(54) FLEXIBLE MAT FOR ABSORBING LIQUIDS COMPRISING POLYMERIC FOAM MATERIALS

(75) Inventors: Jonnie Pehrson Conrad; John C. Dyer; Thomas C. Hortel; Roxanne Drago Westendorf, all of Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/190,605

(22) Filed: Nov. 12, 1998

(51) Int. Cl.⁷ ....................................................... B32B 3/26
(52) U.S. Cl. .................... 442/370; 428/304.4; 428/319.9
(58) Field of Search ............................ 442/370; 428/220, 428/304.4, 319.9, 338

(56) References Cited

U.S. PATENT DOCUMENTS

| | | |
|---|---|---|
| 3,255,127 | 6/1966 | von Bonin et al. . |
| 3,256,219 | 6/1966 | Will . |
| 3,431,911 | 3/1969 | Meisel, Jr. . |
| 3,563,243 | 2/1971 | Lindquist . |
| 3,565,817 | 2/1971 | Lissant . |
| 3,640,753 | 2/1972 | Krauch et al. . |
| 3,734,867 | 5/1973 | Will . |
| 3,763,056 | 10/1973 | Will . |
| 3,778,390 | 12/1973 | Ulrich, Jr. . |
| 3,806,474 | 4/1974 | Blair . |
| 3,988,508 | 10/1976 | Lissant . |
| 3,993,074 | 11/1976 | Murray et al. . |
| 3,994,298 | 11/1976 | DesMarais . |
| 4,029,100 | 6/1977 | Karami . |
| 4,049,592 | 9/1977 | Marans et al. . |
| 4,061,145 | 12/1977 | DesMarais . |
| 4,067,832 | 1/1978 | DesMarais . |
| 4,093,570 | 6/1978 | Miyake et al. . |
| 4,110,276 | 8/1978 | DesMarais . |
| 4,132,839 | 1/1979 | Marans et al. . |
| 4,262,052 | 4/1981 | Kannan et al. . |
| 4,376,440 | 3/1983 | Whitehead et al. . |
| 4,394,930 | 7/1983 | Korpman . |
| 4,425,130 | 1/1984 | DesMarais . |
| 4,473,611 | 9/1984 | Haq . |

(List continued on next page.)

FOREIGN PATENT DOCUMENTS

| | | |
|---|---|---|
| 3 109 929 A1 | 1/1982 | (DE) . |
| 0 017 671 A1 | 10/1980 | (EP) . |
| 0 017 672 A1 | 10/1980 | (EP) . |
| 0 049 768 A1 | 4/1982 | (EP) . |
| 0 068 830 A1 | 1/1983 | (EP) . |
| 0 299 762 | 1/1989 | (EP) . |
| 0 480 379 A2 | 4/1992 | (EP) . |
| 1340520 | 9/1963 | (FR) . |
| 1 493 356 | 11/1977 | (GB) . |
| 2 188 055 | 9/1987 | (GB) . |
| 2 323 811 | 10/1998 | (GB) . |
| 2-239863 | 9/1990 | (JP) . |
| 2-289608 | 11/1990 | (JP) . |
| 3-49759 | 3/1991 | (JP) . |
| WO 93/04092 | 3/1993 | (WO) . |
| WO 94/28839 | 12/1994 | (WO) . |
| WO 96/21682 | 7/1996 | (WO) . |
| WO 97/32612 | 9/1997 | (WO) . |
| WO 98/43572 | 10/1998 | (WO) . |

OTHER PUBLICATIONS

Lissant et al., "Structure of High Internal Phase Radio Emulsions", Journal of Colloid & Interface Science, vol. 47, No. 2, pp 416–423, (May 1974).

Lissant et al., "A Study of Medium and High Internal Phase Ratio Water/Polymer Emulsions", Journal of Colloid & Interface Science, vol. 42, No. 1, pp 201–108, (Jan. 1973).

Lissant, K.J., "The Geometry of High–Internal–Phase Ratio Emulsions", Journal of Colloid & Interface Science, vol. 22, No. 5, pp 462–468, (Nov. 1966).

Aubert et al., "Low Density, Microcellular Polystyrene Foams", Polymer, V 26, pp 2047–2054, (1985) No month.

LeMay, J.D., "Mechanical Structure Property Relationships of Microcellular, Low Density Foams", Mat. Res. Soc. Symp. Proc., vol. 207, pp 21–26, (1991) No month.

Weber et al., "New Melamine–based Elastic Foam", Kunststoffe German Plastics, pp 843–848, (Nov. 1985).

Young et al., "Preparation of Multishell ICF Target Plastic Foam Cushion Materials by Thermally Induced Phase Inversion Processes", J. Vac. Sci. Technol., vol. 20, No. 4, pp 1094–2004, (Apr. 1982).

Gibson et al., "The Mechanics of Foams: Basic Results" and "The Mechanics of Foams: Refinements", Cellular Solids Structure & Properties, Chpts. 5 & 6, pp 120–200 (1988) No month.

Aerogels, Jochen Fricke, pp. 92–97. No date.

Bhumgara, B., "Polymeric Foam Materials on Filtration Media", Filtration and Separation (Mar. 1995), p 245–251.

Williams, J.W., "High Internal Phase Water–In–Oil Emulsions: Influence of Surfactants and Cosurfactants on Emulsion Stability and Foam Quality", Langmuir, vol. 7, No. 7, pp. 1370–1377 (Jan. 1991).

Kong, F–M., et al. "Summary Abstract: Low–density polystyrene foam materials for direct–drive last inertial confinement fusion targets", J. Vac. Sci. Tech. A., vol. 6, No. 3, pp. 1894–1895 (May/Jun. 1988).

Hainey, P., et al., "Synthesis and Ultrastructural Studies of Styrene–Divinylbenzene Polyhipe Polymers", Macromolecules, vol. 24, No. 1, pp. 117–121 (1991) No month.

*Primary Examiner*—Blaine Copenheaver
(74) *Attorney, Agent, or Firm*—Edward J. Milbrada; Kevin D. Hogg; Mary Catherine Hentz

(57) ABSTRACT

Disclosed are protective, flexible mats for absorbing liquids on floors and other surfaces which contain a waterproof component and a polymeric foam sheet formed by polymerizing a high internal phase water-in-oil emulsion. The mats can also contain a non-skid material and/or at least one liquid pervious sheet. The mats are suitable for absorbing hydrophilic and hydrophobic liquids.

27 Claims, 4 Drawing Sheets

U.S. PATENT DOCUMENTS

| | | |
|---|---|---|
| 4,483,895 | 11/1984 | Deaver . |
| 4,522,953 | 6/1985 | Barby et al. . |
| 4,536,521 | 8/1985 | Haq . |
| 4,540,717 | 9/1985 | Mahnke et al. . |
| 4,554,297 | 11/1985 | Dabi . |
| 4,603,069 | 7/1986 | Haq et al. . |
| 4,606,958 | 8/1986 | Haq et al. . |
| 4,609,580 | 9/1986 | Rockett et al. ............... 428/198 |
| 4,611,014 | 9/1986 | Jones et al. . |
| 4,612,334 | 9/1986 | Jones et al. . |
| 4,613,543 | 9/1986 | Dabi . |
| 4,668,709 | 5/1987 | Jones et al. . |
| 4,724,242 | 2/1988 | Vassileff . |
| 4,725,628 | 2/1988 | Garvey et al. . |
| 4,731,391 | 3/1988 | Garvey . |
| 4,740,528 | 4/1988 | Garvey et al. . |
| 4,775,655 | 10/1988 | Edwards et al. . |
| 4,788,225 | 11/1988 | Edwards et al. . |
| 4,797,310 | 1/1989 | Barby et al. . |
| 4,822,669 | 4/1989 | Roga . |
| 4,839,395 | 6/1989 | Masamizu et al. . |
| 4,957,810 | 9/1990 | Eleouet et al. . |
| 4,959,341 | 9/1990 | Wallach . |
| 4,961,982 | 10/1990 | Taylor . |
| 4,965,289 | 10/1990 | Sherrington et al. . |
| 4,966,919 | 10/1990 | Williams, Jr. et al. . |
| 4,972,002 | 11/1990 | Volkert . |
| 4,973,610 | 11/1990 | Hahn et al. . |
| 4,985,467 | 1/1991 | Kelly et al. . |
| 4,985,468 | 1/1991 | Elmes et al. . |
| 4,990,541 | 2/1991 | Nielsen et al. . |
| 4,992,254 | 2/1991 | Kong . |
| 5,021,462 | 6/1991 | Elmes et al. . |
| 5,028,468 | 7/1991 | Taylor . |
| 5,034,424 | 7/1991 | Wenning et al. . |
| 5,037,859 | 8/1991 | Williams, Jr. et al. . |
| 5,047,225 | 9/1991 | Kong . |
| 5,065,752 | 11/1991 | Sessions et al. . |
| 5,066,684 | 11/1991 | LeMay . |
| 5,066,784 | 11/1991 | Sherrington et al. . |
| 5,110,838 | 5/1992 | Tokiwa et al. . |
| 5,116,880 | 5/1992 | Tokiwa et al. . |
| 5,116,883 | 5/1992 | LeMay . |
| 5,128,382 | 7/1992 | Elliott, Jr. et al. . |
| 5,134,007 | 7/1992 | Reising et al. . |
| 5,134,171 | 7/1992 | Hammel et al. . |
| 5,147,345 | 9/1992 | Young et al. . |
| 5,149,720 | 9/1992 | DesMarais et al. . |
| 5,189,070 | 2/1993 | Brownscombe et al. . |
| 5,198,472 | 3/1993 | DesMarais et al. . |
| 5,200,433 | 4/1993 | Beshouri . |
| 5,210,104 | 5/1993 | Bass et al. . |
| 5,210,108 | 5/1993 | Spinu et al. . |
| 5,221,726 | 6/1993 | Dabi et al. . |
| 5,250,579 | 10/1993 | Smits et al. . |
| 5,252,619 | 10/1993 | Brownscombe et al. . |
| 5,260,345 | 11/1993 | DesMarais et al. . |
| 5,268,224 | 12/1993 | DesMarais et al. . |
| 5,276,067 | 1/1994 | Doerge . |
| 5,290,820 | 3/1994 | Brownscombe et al. . |
| 5,318,554 | 6/1994 | Young et al. . |
| 5,336,208 | 8/1994 | Rosenbluth et al. . |
| 5,336,695 | 8/1994 | Nass et al. . |
| 5,352,711 | 10/1994 | DesMarais . |
| 5,387,207 | 2/1995 | Dyer et al. . |
| 5,500,267 | 3/1996 | Canning . |
| 5,633,291 | 5/1997 | Dyer et al. . |
| 5,715,772 | 2/1998 | Kamrath et al. . |
| 5,753,359 | 5/1998 | Dyer et al. . |
| 5,817,704 | 10/1998 | Shiveley et al. . |

FLEXIBLE MAT FOR ABSORBING LIQUIDS COMPRISING POLYMERIC FOAM MATERIALS

FIELD OF THE INVENTION

The present invention relates to a protective, flexible, absorbent mat which is used on floors and other surfaces.

BACKGROUND OF THE INVENTION

The protection of surfaces such as floors, carpets, rugs, furniture, upholstery and other surfaces is of significant commercial interest. Similarly of interest are examples wherein the direction of the protection is reversed, e.g., to protect an item or person from contamination by the environment. Protective coverings including films, towels, rugs and other woven or nonwoven fabrics both disposable and non-disposable have been widely used. Generally, these materials are not satisfactory in all respects. For example, many provide inadequate fluid absorbency and cannot soak up and retain spilled fluids. Others tear or abraid easily and generally lack the necessary mechanical strength for use. Still others are expensive and may require laundering and reuse. Some constructions lack sufficient stability when exposed to light, radiation, or certain chemicals which may further limit their utility.

Mats which contain a foam or cellular polymer, such as are described in "Polymer Foams", ACS Symposium Series 669, Khemani, K. C., Ed.; American Chemical Society, Wash., DC, 1997, are well known in the art. For example, U.S. Pat. No. 4,822,669 (Roga) issued Apr. 18, 1987, discloses a low cost absorbent mat having a top layer of nonwoven fiber laminated with a water impervious film and a bottom layer of polyurethane foam. The function of the foam in this instant appears to relate to providing a resilient mat for comfort reasons. The foam further provides a nonskid bottom surface. U.S. Pat. No. 45,028,468 (Taylor) issued Jul. 2, 1991 discloses a surgical mat with disposable cover for use in an operating room having a resilient or foam material to reduce fatigue of the user. U.S. Pat. No. 5,658,637 (Volz) issued Aug. 2, 1995 discloses a slip-resistant washable floor mat suitable for use in motor vehicles 1995 discloses a slip-resistant washable floor mat suitable for use in motor vehicles having a layer of coarse-celled polyurethane foam. Other similar references include U.S. Pat. No. 3,856,610 (Bruneel) issued Dec. 24, 1974, U.S. Pat. No. 4,421,809 (Bish et al.) issued Dec. 20, 1983, U.S. Pat. No. 4,143,194 (Wihksne) issued Mar. 6, 1979, U.S. 4,285,075 (Nelson) issued Aug. 15, 1981, and U.S. Pat. No. 4,609,580 (Rockett et al.) issued Sep. 2, 1986. The citations in this paragraphs are all incorporated herein by reference.

The use of an absorbent foam in such an article would be useful in that it could both provide for absorbency of contacted (spilled) liquids while also conferring a cushioning benefit. This could further extend the utility of such mats to include spill wipe up in addition to protection. Articles containing absorbent foams are also known. One type of absorbent foam is prepared by polymerizing High Internal Phase Emulsions (hereafter referred to as "HIPEs"). Such foams (hereinafter referred to as HIPE foams) are described in, for example, U.S. Pat. No. 5,260,345 (DesMarais et al.) issued Nov. 9, 1993, U.S. Pat. No. 5,268,224 (DesMarais et al.) issued Dec. 7, 1993, U.S. Pat. No. 5,387,207 (Dyer et al.) issued Feb. 7, 1995, and U.S. Pat. No. 5,650,222 (DesMarais et al) issued Jul. 22, 1997, (each of which is incorporated herein by reference). Absorbent articles made using such HIPE foams for mopping up household spills are known in the art and include U.S. Pat. No. 4,606,958 (Haq et al.) issued Aug. 19, 1986. Surgical drapes and bandages can also be formed from HIPE-foams modified to absorb blood, as described in U.S. Pat. No. 5,795,921 (Dyer et al.) issued Aug. 18, 1998. HIPE-foams offer the advantage of high absorbent capacity and fluid retention. However, these foams are typically not durable enough to be used alone and must be incorporated in a substrate or other non- polymeric foam material to be of benefit. application Ser. No. WO 99/46319 published in the name of DesMarais, et al on Sep. 16, 1999. discloses a version of these HIPE foams having extraordinary toughness and strength relative to previous versions. Absorbent foams other than HIPE foams are well known in the art. However, such foams lack the necessary fine microstructure to hold fluids effectively. Mats made using such foams, for example, polyurethane foams, will drain if lifted in a vertical position. Further, polyurethane foams are not sufficiently stable with respect to exposure to light to be universally useful without unsightly yellowing.

SUMMARY OF THE INVENTION

The present invention encompasses a flexible mat for absorbing liquids for use on floors and other surfaces comprising:
a) a waterproof backing layer or treatment;
b) a HIPE foam sheet formed by polymerization of water-in-oil emulsion having:
  1) an oil phase comprising:
    a) from about 85 to about 98%, by weight of the oil phase, said monomer component comprising:
      i) from about 45 to about 70%, by weight of the monomer component, of a substantially water-insoluble, monofunctional monomer capable of forming a homopolymer having a Tg of about 25° C or less;
      ii) from about 25 to about 45%, by weight of the monomer component, of a substantially water-insoluble, monofunctional comonomer capable of imparting toughness about equivalent to that provided by styrene;
      iii) from about 3 to about 25%, by weight of the monomer component, of a first substantially water-insoluble, polyfunctional crosslinking agent selected from the group consisting of divinylbenzenes and analogs thereof;
      iv) from 0 to about 15%, by weight of the monomer component, of a second substantially water-insoluble, polyfunctional crosslinking agent selected from the group consisting of polyfunctional acrylates, methacrylates, acrylamides, methacrylamides, and mixtures thereof;
      v) wherein the weight ratio of the monofunctional comonomer capable of imparting toughness (ii) to the sum of the first and second polyfunctional crosslinking agents (iii+iv) is at least about 1:1;
    b) from about 2 to about 15%, by weight of the oil phase, of an emulsifier component which is soluble in the oil phase and which is suitable for forming a stable water-in-oil emulsion; and
  2) a water phase comprising from about 0.1 to about 20%, by weight of the water phase, of a water-soluble electrolyte; and
  3) a volume to weight ratio of water phase to oil phase of at least about 12:1.

The mats can optionally contain optional components such as at least one liquid pervious sheet, and a non-skid material.

All percentages, ratios and proportions herein are by weight, unless otherwise specified. All documents cited are, in relevant part, incorporated herein by reference.

DETAILED DESCRIPTION OF THE INVENTION

Figure 1:
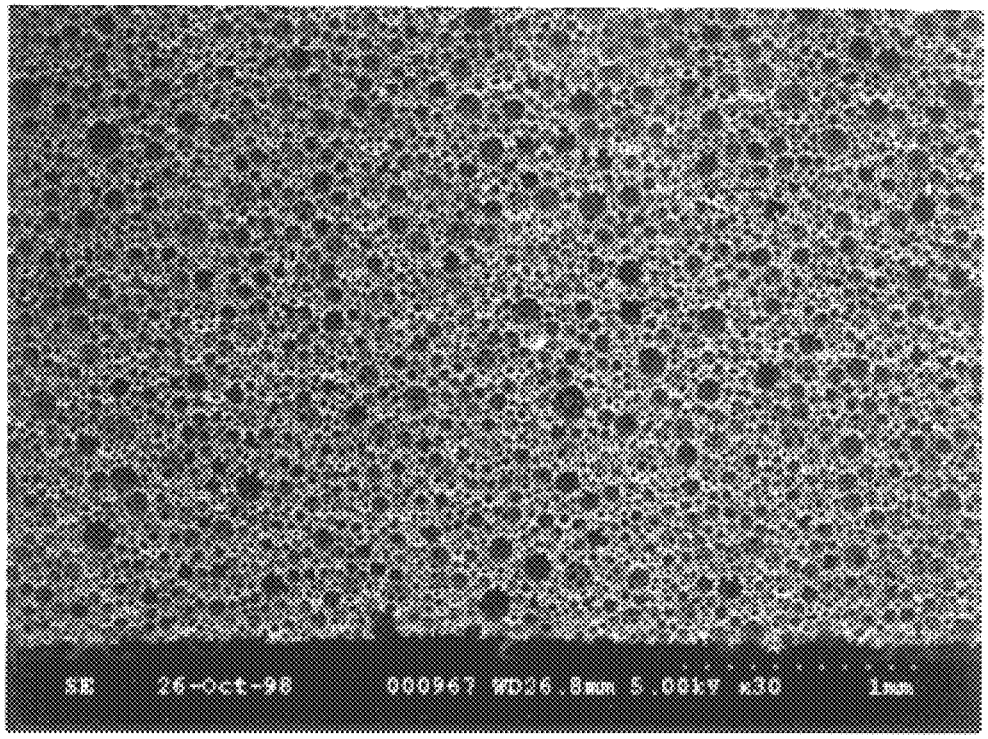
FIG. 1 of the drawings is a scanning electron micrograph (hereinafter "SEM") (30×magnification) of a cut section of a representative polymeric foam useful in the present invention according to Example I, Table 1, Number 1.
Figure 2:
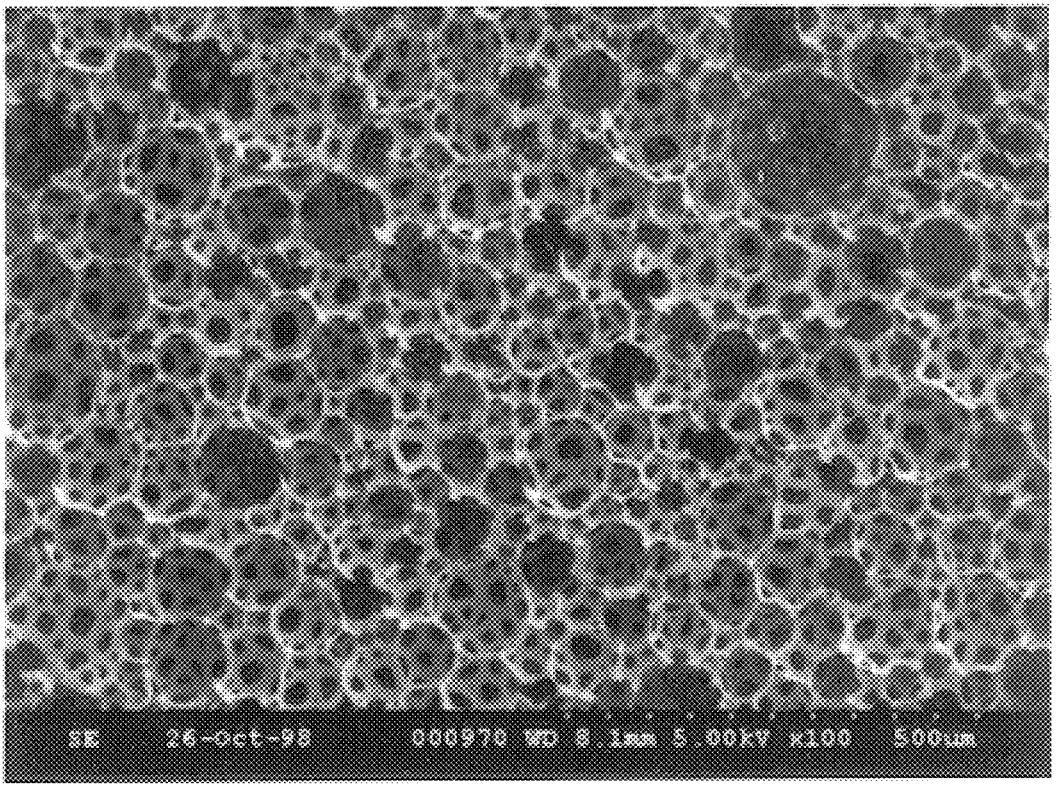
FIGS. 2 and 3 of the drawings are photomicrographs (100×magnification) of the foam of FIG. 1.
Figure 3:
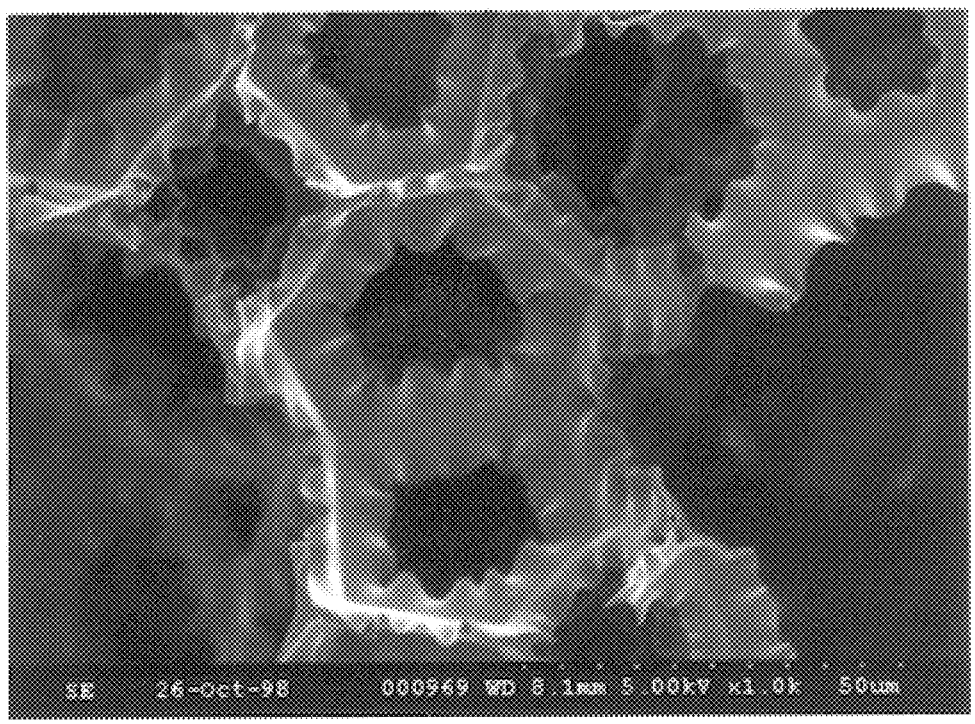
Figure 4:
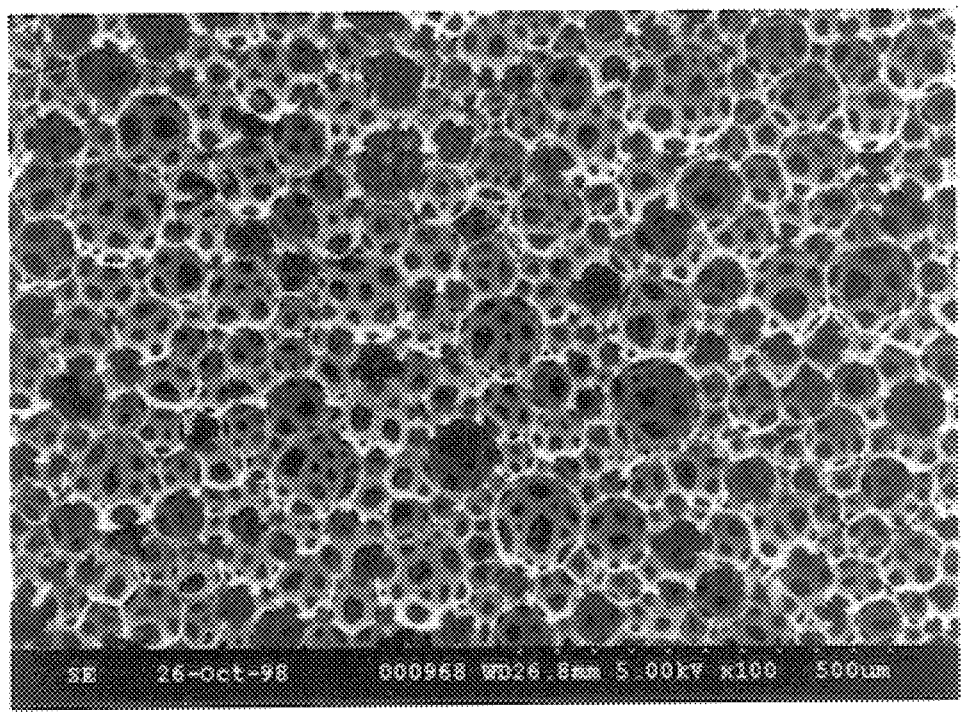
FIG. 4 of the drawings is a photomicrograph (1000×) of the foam of FIG. 1.

A critical component of the protective, semi-durable, absorbent mat herein comprises a flexible and absorbent HIPE foam, typically in sheet form. The flexibility of the HIPE foam is desired for both ease of use (conformability) and comfort (as when a user stands, sits, or kneels on the mat). Flexibility derives from the thickness of the sheet, its various components including the HIPE foam, and the glass transition temperature or Tg of the HIPE foam. To confer flexibility, it is generally preferred that the Tg of the HIPE foam be near or below the temperature of intended use. However, in some cases a stiffer mat may be desired wherein the Tg is higher than the temperature of intended use.

The HIPE foam may be surface treated so as to render it hydrophilic and absorbent with respect to aqueous fluids. Since the chemical composition of the polymeric foam typically renders it highly lipophilic as well, the polymeric foam can provide both hydrophilicity and lipophilicity simultaneously. Such duality is generally preferred for broadest utility, though in specific instances the hydrophilicity may not be desired. HIPE foams typically have a generous absorbent capacity, e.g., relatively little foam is needed to absorb a relatively large amount of liquid, usually expressed in terms of g/g capacity. Also, the HIPE foam can imbibe the liquid quickly and completely. This is achieved by a combination of modification of the cell sizes of the foam and the hydrophilicity of the surface. Further, the HIPE foam will retain the imbibed fluid better than other materials including other absorbent foams when the sheet is transposed into the vertical dimension or when another material (such as the knee of the user) is placed on the surface of the mat.

The HIPE foam of the current invention may be sliced to provide a sheet of relatively thin material for incorporation into the mat. The thickness of such slices will typically be between about 0.5 mm and 5 mm, preferably between about 1.5 mm and 3 mm, such a range generally found to provide sufficient absorbent capacity and mechanical strength while also being flexible and easy to slice. The HIPE foam may also be used in a "thin-until-wet" state as described in U.S. Pat. No. 5,387,207, supra. The HIPE foam may also have heterogeneous character as described more fully in U.S. Pat. No. 5,817,704 (Shiveley et al.) issued Oct. 6, 1998, incorporated herein by reference. For example, mats made from such heterogeneous HIPE foams may be rigid in more region or regions and flexible in yet others so as to provide conformity to a particular predetermined shape or location and use. Similarly, the mat made from these foams may be hydrophilic in the interior region and hydrophobic near the edges so as to reduce edge leakage of the product. Additionally, it may be useful to form the mats of the present invention wherein two or more sheet of HIPE foam are layered within the product. For example, an upper layer may comprise larger-celled foams which are preferred for rate of fluid imbibition. The lower layer may then comprise smaller-celled foams which are preferred for tenacity of fluid holding. In a preferred embodiment, such a design provides a mat which remains substantially dry to the touch even when it contains a relatively high level of liquid. This can be especially useful wherein the mat is used in a door way or in an automobile because the users shoes will not track wetness into other areas past the mat itself. In previous protective mats, this often is a problem once the mat absorbs even relatively small amounts of liquid.

In the present invention, the thickness of the polymeric foam sheet can be varied within an individual sheet thereby providing an additional physical barrier for spill control and protection. For example, the outer edges of the polymeric foam sheet could be formulated to be thicker than the internal portion of the sheet to provide for containment of fluids until they are fully absorbed by the mat.

The mat of the present invention can be a single piece of polymeric foam sheet shaped as desired or needed to best fit the end use. The mat can also comprise more than one polymeric foam sheet that can be adhesively bonded or otherwise linked together to deliver the desired size. Furthermore, the mat can be cut by the user to a desired shape and size. It is also envisioned that the mats could be manufactured with perforations or other divisions thereby allowing the user to easily choose a desired size based on his/her need at the time of use. The mat may also be specifically cut for special uses, such as, for example, shoe and boot inserts. As stated above, the mats of the present invention can be made to any size which will meet the needs of the user. Particularly useful are mats having the following dimensions: 5"×5", 8"×10", 11"×11", 15"×19", 24"×36", 36"×60", and the like.

I. Uses

The mats of the present invention are very versatile and incorporate a wide variety of uses including, protecting surfaces from water, rain, moisture, dirt, mud, bodily fluids (including blood, mucous, feces, and the like), oil, grease, transmission and brake fluid, and other bydrophilic or hydrophobic liquids. These mats can be used, for example, outdoors, in shoes and boots, in homes, garages, repair shops, automobiles, offices, vending machine areas, kitchens, refrigerators, under defrosting foods, restaurants, schools, surgeries, emergency rooms, athletic and fitness facilities, showers, schools, health care facilities, in the cleaning up of spills, especially large volume spills, and in industry. The user benefits of mats include protection of durable surfaces, i.e., lower frequency of professional cleaning, prevention of damage, maintenance of appearance/function of surfaces so as to increase useable life, large spill wipe-up, and reduction of food losses that can be caused by contamination from leaking meats and vegetables.

As discussed above, the size, shape, and thickness of these mats can be modified based on the desired end use of the article. Accordingly, the following is a nonlimiting list of potential uses for mats of the present invention: door mats for wet/muddy/dirty feet, pets, umbrellas, snow, etc.; shoe inserts; car seat and carpet protectors; car trunk liners; under a child's high chair; under chair/table while child or adult is doing crafts; under baby during diaper changing; in front of or under sinks; under or in front of appliances which may leak or overflow; in the refrigerator as a shelf liner or under thawing meats; in the pantry under oil containers; in the garage for oil, gas leaks and spills; under houseplants; under pet's food/water bowls; under litter boxes; as pet cage liners; as a protective throw for bedwetting or incontinence; spill clean ups; bath mats; around the toilet; as a stadium cushion or blanket to protect from wet surfaces and insulate; disposable, absorbent coasters and place mats; in food/drink areas; as trivets; any spill or leak requiring more than a couple of paper towels for clean up.

II. Polymeric Foam Sheet Characteristics

HIPE foams of the present invention are comprised of specific combinations of monomers which to a large extent control the ultimate properties of the foam. The types of monomers used fall into the following three general categories: (1) monomers which help maintain a desirable Tg in the resulting polymer, (2) monomers which help confer "toughness" to the resulting polymer, herein referred to as "toughening monomers", and (3) monomers which have di-, tri-, tetra-, and higher functionality useful in conferring crosslinks within the resulting polymer, herein referred to as crosslinkers. These crosslinkers are particularly critical in achieving the desired compressive strength or modulus and/or elasticity which is required for many foam applications. Comonomers which confer strength while lacking sufficient molecular flexibility tend to increase Tg. An example is divinyl benzene, a crosslinker wherein higher levels may increase the strength of the polymer while also increasing the Tg. Tg is usually important to the use of any polymer. While in some uses a relatively high Tg may be desired, many uses require a degree of flexibility which requires a lower Tg which in general is more difficult to attain via formulation than a higher Tg. Also, with HIPE foams, the dewatering process can be significantly complicated in the event of a very high Tg foam (>100° C.).

The polymeric foams of the present invention are relatively open-celled. This means the individual cells of the foam are in complete, unobstructed communication with adjoining cells. The cells in such substantially open-celled foam structures have intercellular openings or "windows" connecting one cell to another within the foam structure.

These substantially open-celled foam structures will generally have a reticulated character with the individual cells being defined by a plurality of mutually connected, three dimensionally branched webs. The strands of polymeric material making up these branched webs can be referred to as "struts." As used herein, a foam material is "open-celled" if at least 80% of the cells in the foam structure that are at least 1 $\mu$m in size are in open communication with at least one adjacent cell. This may be determined by inspection of an SEM of the foam.

A. Glass Transition Temperature

Typically, an important parameter of the foams of the present invention is the glass transition temperature (Tg). The Tg represents the midpoint of the transition between the glassy and rubbery states of the polymer. Foams that have a Tg higher than the temperature of use can be very strong but can also be very rigid and potentially prone to fracture. Though the end use of a particular foam is an important factor when determining the desired Tg of the foam, useful are foams having a Tg of less than 70° C., preferred are foams having a Tg of from about −40° to about 50° C., more preferably from about 0 ° to about 40° C., most preferably from about 10° to about 30° C. The method for determining Tg by Dynamic Mechanical Analysis (DMA) is described in the TEST METHODS section of U.S. Pat. No. 5,753,359 (Dyer et al.), issued May 19, 1998, incorporated herein by reference.

B. Foam Density

Another potentially important property of the foams of the present invention is their density. "Foam density" (i.e., in grams of foam per cubic centimeter of foam volume in air) is specified herein on a dry basis, unless otherwise indicated. Any suitable gravimetric procedure that will provide a determination of mass of solid foam material per unit volume of foam structure can be used to measure foam density. For example, an ASTM gravimetric procedure described more fully in the TEST METHODS section of U.S. Pat. No. 5,387,207 (Dyer et al.), supra, is one method that can be employed for density determination. While foams can be made with virtually any density ranging from below that of air to just less than the bulk density of the polymer from which it is made, the foams of the present invention are most useful when they have a dry density in the expanded state of less than about 80 mg/cc, generally between about 75 and about 38 mg/cc, and more generally between about 63 and 48 mg/cc. The exact preference is dependent on the nature of the application under consideration and may vary within these ranges.

C. Cell Size

Foam cells, and especially cells that are formed by polymerizing a monomer-containing oil phase that surrounds relatively monomer-free water-phase droplets, will frequently be substantially spherical in shape. The size or "diameter" of such spherical cells is a commonly used parameter for characterizing foams in general. Since cells in a given sample of polymeric foam will not necessarily be of approximately the same size, an average cell size, i.e., average cell diameter, will often be specified.

A number of techniques are available for determining the average cell size of foams. The most useful technique, however, for determining cell size in foams involves a simple measurement based on the scanning electron photomicrograph of a foam sample. (See FIG. 1)

The cell size measurements given herein are based on the number average cell size of the foam, e.g., as shown in FIG. 1. The foams of the present invention will generally have a number average cell size of not more than about 150 $\mu$m, more generally from about 50 to 130 $\mu$m, and most generally from about 80 $\mu$m to 120 $\mu$m. Wherein two layers of foams are used in the article of the present invention, the upper foam layer will have cell sizes preferably between about 50 and 130 $\mu$m and the lower foam layer (lower meaning closest to the impermeable back sheet) will have cell sizes preferably between about 15 and 50 $\mu$m. The lower foam layer may be in a "thin-until-wet" condition with enough free volume allowed for full expansion of that layer.

III. Waterproof Component

The mats of the present invention also contain a waterproof component. This waterproof component is attached to the back side of the polymeric foam sheet thus creating a liquid impervious barrier on one side of the sheet. Liquid impervious, as used herein, refers a substance which is incapable of being penetrated by liquids, either hydrophilic or hydrophobic. The waterproof component(s) suitable for use herein are any composition or substance commonly known in the art. For example, waterproof materials are described in U.S. Pat. Nos. 4,609,580 (Rockett et al.), issued Sep. 2, 1986; 4,822,669 (Roga), issued Apr. 18, 1989; and 5,082,707 (Fazio), issued Jan. 21, 1992; all of which are incorporated herein by reference. The waterproof component can be coated onto the back side of the polymeric foam sheet or in sheet form itself where it is attached to the back side of the foam sheet by lamination, by use of an adhesive or other means commonly known in the art.

A waterproof component in sheet form is impervious to liquids and preferably comprises a thin plastic film, although other flexible liquid impervious materials may also be used.

As used herein, the term "flexible" refers to materials which are compliant and will readily conform to the general shape and contours of the polymeric sheet. The waterproof sheet may comprise a woven or nonwoven material, polymeric films such as films of polyethylene, polypropylene, or polyurethane, or composite materials such as a film-coated nonwoven material. A suitable waterproof sheet is a polyethylene film having a thickness of from about 0.012 mm (0.5 mil) to about 0.051 mm (2.0 mils). Exemplary polyethylene films are manufactured by Clopay Corporation of Cincinnati, Ohio, under the designation P18-1401 and by Tredegar Film Products of Terre Haute, Ind., under the designation XP-39385. Preferred for use herein are polypropylene/ethylenevinyl acetate films, manufactured by Clopay under the designation P18-3161. The waterproof sheet may be embossed and/or matte finished to provide a more clothlike appearance. The size of the waterproof sheet is dictated by the shape and size of the polymeric film sheet and is sized to match the polymeric film sheet.

The waterproof sheet is positioned on the back side of the polymeric foam sheet and is attached to the polymeric foam sheet in any manner known in the art, such as, for example, the disclosure in U.S. Pat. No. 4,609,580 (Rockett et al.), issued Sep. 2, 1986. Embodiments of the present invention are also envisioned wherein portions of the polymeric foam sheet are unattached to the waterproof sheet. The waterproof sheet can be secured to the polymeric foam sheet by a uniform continuous layer of adhesive, a patterned layer of adhesive, or an array of separate lines, spirals, or spots of adhesive. Adhesives which have been found to be satisfactory are manufactured by H. B. Fuller Company of St. Paul, Minnesota under the designation HL-1258 or H-2031, and pressure sensitive hot melt adhesives manufactured by Heartland Adhesive under the designation H160. The attachment means will preferably comprise an open pattern network of filaments of adhesive as is disclosed in U.S. Pat. No. 4,573,986 (Minetola, et al.) issued Mar. 4, 1986, and which is incorporated herein by reference. An exemplary attachment means of an open pattern network of filaments comprises several lines of adhesive filaments swirled into a spiral pattern such as illustrated by the apparatus and method shown in U.S. Pat. No. 3,911,173 (Sprague, Jr.) issued Oct. 7, 1975; U.S. Pat. No. 4,785,996 (Zwieker, et al.) issued Nov. 22, 1978; and U.S. Pat. No. 4,842,666 (Werenicz) issued Jun. 27, 1989. Each of these patents are incorporated herein by reference. Alternatively, the attachment means may comprise heat bonds, pressure bonds, ultrasonic bonds, dynamic mechanical bonds, or any other suitable attachment means or combinations of these attachment means as are known in the art.

A waterproof component which is coated on the back side of the polymeric foam sheet can be any waterproof composition known in the art which is in a form suitable to be coated, sprayed or in any way uniformly applied to a sheet surface. Such compositions include, but are not limited to fluorocarbon polymers such as are employed in Scotchgard brand products available commercially and manufactured by 3M Co. Essentially any polymer treatment that can render the surface but not interior hydrophobic will suffice.

The waterproof component can also be or include a non-slip or skid resistant material and/or process applied to all or a portion of the polymeric foam sheet so that the mat can be used in a wide variety of situations including walking or standing on the mat. Non-slip materials are known in the art and include the following: urethane, polyurethane, polyether polyurethane, polyester polyurethane, nylon, and Anti Skid manufactured by American Home Products. For example, non-slip or non-skid materials and/or processes are described more fully in U.S. Pat. No. 4,609,580 (Rockett et al.), issued Sep. 2, 1986; U.S. Pat. No. 4,609,580 (Rockett et al.), issued Sep. 2, 1986; and 5,500,267 (Canning), issued Mar. 19, 1996; U.S. Pat. No. 5,662,758 (Hamilton et al.) issued Sep. 2, 1997; and U.S. Pat. No. 5,871,607, issued in the name of Hamilton, et al. on Feb. 16, 1999, all of which are incorporated herein by reference.

IV. Optional Components

A. Liquid Pervious Sheet

The mats of the present invention can optionally include at least one liquid pervious sheet which is attached to the front side of the polymeric foam sheet. The term liquid pervious, as used herein, refers to the ability of a substance to permit liquids, either hydrophilic or hydrophobic, to penetrate readily through its thickness. Suitable liquid pervious sheet may be manufactured from a wide range of materials such as woven and nonwoven materials (e.g., a nonwoven web of fibers), including apertured nonwovens; polymeric materials such as apertured formed thermoplastic films, apertured plastic films, and hydroformed thermoplastic films; porous foams; open-celled foams; reticulated thermoplastic films; and thermoplastic scrims. Liquid pervious sheets can comprise any material such as polyester, polyolefin, rayon, and the like that is substantially porous and permits liquids to readily pass there through and into the underlying polymeric foam sheet. Suitable woven and nonwoven materials can be comprised of natural fibers (e.g., wood or cotton fibers), synthetic fibers (e.g., polymeric fibers such as polyester, polypropylene, or polyethylene fibers) or from a combination of natural and synthetic fibers. When the liquid pervious sheet(s) comprises a nonwoven web, the web may be manufactured by a wide number of known techniques. For example, the web may be spunbonded, spunlace carded, wet-laid, melt-blown, hydroentangled, hydroformed, hydroapertured, combinations of the above, or the like.

The liquid pervious sheet(s) is positioned on the front side of the polymeric foam sheet and is preferably joined completely with the polymeric foam sheet or joined with a portion of the waterproof component sheet in any manner known in the art which will not adversely effect the absorbency capabilities of the polymeric foam sheet. For example, the edges of the liquid pervious sheet(s) can be sealed to the edges of the backsheet using thermal bonded adhesive. Alternatively, the liquid impervious sheet(s) can be attached to the polymeric foam sheet using adhesive and a technique such as spotbonding.

B. Other Optional Components

Various other optional components can be utilized herein to alter the tactile feel, appearance, and/or absorption properties of the mats. The polymeric foam sheet, waterproof sheet and liquid pervious sheet (if present) can be patterned or printed with designs. Other components potentially useful herein include colors, odor absorbents such as activated charcoal and cyclodextrin, perfumes, antibacterials, antimicrobials, and the like can be added. Other items can also be added to expand functionality in use. For example, an elastic or Velcro type band can be added as an aid for securing the mat in place when used over the headrest on the seat of a car. Any additional component which aids in the functionality in using the mat but does not interfere with its absorbent capacity is suitable for use herein.

V. Preparation of Polymeric Foams

A. In General

Polymeric foams of the present invention are prepared by polymerization of HIPEs. The relative amounts of the water and oil phases used to form the HIPEs determine the density of the resulting foam. Density is, among many other parameters, critical to the mechanical and performance properties of the resulting polymeric foams. The ratio of water to oil in the emulsion can also influence the cell size and dimensions of the struts that form the foam. The emulsions used to prepare the HIPE foams will generally have a volume to weight ratio of water phase to oil phase of at least about 12:1, preferably of at least about 13:1. Typically the volume to weight ratio will be from about 13:1 to about 25:1, more typically from about 15:1 to about 20:1.

The process for obtaining these polymeric foams comprises the steps of:

(A) forming a water-in-oil emulsion from:
  (I) an oil phase comprising:
    (a) from about 85% to about 98%, by weight of the oil phase, of a monomer component comprising:
      (i) from about 45% to about 70%, by weight of the monomer component, of a substantially waterinsoluble, monofunctional monomer capable of forming a homopolymer having a Tg of about 25° C. or less;
      (ii) from about 25% to about 45%, by weight of the monomer component, by weight of a substantially water-insoluble, monofunctional comonomer capable of imparting toughness about equivalent to that provided by styrene;
      (iii) from about 3% to about 25%, by weight of the monomer component, of a first substantially waterinsoluble, polyfunctional crosslinking agent selected from the group consisting of divinyl benzene and analogs thereof; and
      (iv) from about 0% to about 15%, by weight of the monomer component, of a second substantially water-insoluble, polyfunctional crosslinking agent selected from the group consisting of diacrylates and dimethacrylates of diols and analogs thereof; and
      (v) wherein the weight ratio of the monofunctional comonomer capable of imparting toughness (ii) to the sum of the first and second polyfunctional crosslinking agents (iii +iv) is at least about 1:1;
    (b) from about 2% to about 15%, by weight of the oil phase, of an emulsifier component which is soluble in the oil phase and which is suitable for forming a stable water-in-oil emulsion;
  (2) an aqueous phase comprising from about 0.1% to about 20%, by weight of the aqueous phase, of a water-soluble electrolyte;
  (3) a volume to weight ratio of aqueous phase to oil phase of at least about 12:1; and
(B) polymerizing the monomer component in the oil phase of the water-in-oil emulsion to form the polymeric foam.

The term "monofunctional", as used herein, refers to having one polymerizable moiety. The term "polyfunctional", as used herein, refers to having more than one polyrnerizable moiety.

The polymeric foam material can be subsequently iteratively dewatered and washed to provide a dry, hydrophobic foam. The foam may be rendered hydrophilic by appropriate surface treatment with any of a number of hydrophilizing agents, including calcium chloride and similar salts, residual emulsifiers used for stabilizing the HIPE, and other wetting agents well known to those skilled in the art. Hydrophilizing treatments are described in, e.g., U.S. Pat. No. 5,387,207 (Dyer et al.), issued Feb. 7, 1995 (see especially column 22 to column 24), which is incorporated herein by reference.

These foams may then be shaped into sheets. These sheets may optionally be compressed, e.g. continuously through pressure nips, into a thin state and wound into rolls. Compressible sheets can retain their relatively thin compressed state until unwound, applied as desired, and either heated above their activation temperature (usually about the Tg of the polymer) or allowed to stand for a relatively long period of time, e.g. several weeks or months, depending on the ambient temperature, as described in U.S. Pat. No. 5,770,634 (Dyer et al.) issued Jun. 23, 1998, incorporated herein by reference. Foams are defined as "thin-until-wet" when the foam is compressed to 33% of its original expanded thickness or less and is thereafter maintained without artificial restraint on its surface, the foam will reexpand by no more than 50% after 21 days at 22° C. The method for measuring this is described in U.S. Pat. No. 5,770,634, (DesMarais et al.), issued Jun. 23, 1998, incorporated herein by reference.

1. Oil Phase Components

The continuous oil phase of the HIPE comprises comonomers that are polymerized to form the solid foam structure. This monomer component is preferably formulated to be capable of forming a copolymer having a Tg of less than 70° C., generally from about 31 40° to about 50° C., more generally from about 0° to about 40° C., and most generally from about 10° to about 30° C.

The monomer component of the oil phase may typically comprise Tg lowering monofunctional monomers, monomers which impart toughness, at least one polyfunctional crosslinking agent, at least one emulsifier. In addition the oil phase may contain additional optional components. Optional oil phase components include antioxidants, plasticizers, filler particles, flame retardants, colorants (dyes or pigments), fluorescent agents, chelants, opacifying agents, and chain transfer agents. The monomer components are described in detail below.

The selection of particular types and amounts of monofunctional monomer(s) and comonomer(s) and polyfunctional cross-linking agent(s) can be important to the realization of HIPE foams having the desired combination of structure, and mechanical properties which render such materials suitable for use in the invention herein.

a. Tg Lowering Monofunctional Monomers

One component of the oil phase comprises at least one monofunctional comonomer whose atactic amorphous homopolymer has a Tg of about 40° C. or lower (see Brandup, J.; Immergut, E. H. "Polymer Handbook", 2nd Ed., Wiley-Interscience, New York, N.Y., 1975, III-139.), described hereinafter as a "Tg lowering monomer". These monomers tend to impart rubber-like properties to the resulting polymeric foam structure.

Other Tg lowering monomers suitable for use herein are disclosed in U.S. Pat. No. 5,770,634 (DesMarais et al.), supra, especially including $C_4$–$C_{12}$ alkyl styrenes such as p-n-octylstyrene, isoprene, butadiene, 1,3,7-octatriene, and piperylene. These monofunctional monomer(s) will generally comprise 45 to about 70%, more preferably from about 20 to about 60%, by weight of the monomer component.

b. Comonomers Imparting Toughness.

The monomer component utilized in the oil phase of the HIPEs may also comprise one or more monofunctional comonomers capable of imparting toughness about equivalent to that provided by styrene to the resulting polymeric foam structure. Tougher foams exhibit the ability to deform substantially without failure. These monofunctional comonomer types can include styrene-based comonomers (e.g., styrene and ethyl styrene) or other monomer types such as methyl methacrylate where the related homopolymer is well known as exemplifying toughness. The preferred monofunctional comonomers of this type are styrene-based monomers including styrene and ethyl styrene. The monofunctional "toughening" comonomer will normally comprise from about 25 to about 45%, preferably from about 30% to about 40%, most preferably about 35% by weight of the monomer component. In certain cases, the "toughening" comonomer can also impart the desired rubber-like properties to the resultant polymer. For such comonomers, the amount that can be included in the monomer component will be that of the typical monomer and comonomer combined. An example is 4-octylstyrene.

c. Polyfunctional Crosslinking Agent

The monomer component contains at least one polyfunctional crosslinking agent. As with the monofunctional monomers and comonomers, selection of the particular type and amount of crosslinking agent(s) is important to the realization of polymeric foams having the desired combination of structural and mechanical properties.

The polyfunctional crosslinking agent can be selected from a wide variety of monomers containing two or more activated vinyl groups, such as divinylbenzenes and analogs thereof. Analogs of divinylbenzenes useful herein include, but are not limited to, trivinyl benzenes, divinyltoluenes, divinylxylenes, divinylnaphthalenes divinylalkylbenzenes, divinylphenanthrenes, divinylbiphenyls, divinyldiphenylmethanes, divinylbenzyls, divinylphenylethers, divinyldiphenylsulfides, divinylfirans, divinylsulfide, divinylsulfone, and mixtures thereof. Divinylbenzene is typically available commercially as a mixture with ethyl styrene in proportions of about 55:45. These proportions can be modified so as to enrich the oil phase with one or the other component. To provide for a low Tg, it is advantageous to enrich the mixture with the ethyl styrene component while simultaneously reducing the amount of styrene in the monomer blend. The cross-linking agent can generally be included in the oil phase of the HIPE in an amount of from about 3 to about 25%, more preferably from about 4 to about 20%, most preferably from about 5% to about 15%, by weight of the monomer component (on a 100% basis).

The crosslinking agent can also be selected from polyfunctional acrylates or methacrylates such as those disclosed in in U.S. Pat. No. 5,770,634 (DesMarais et al.), supra. This second cross-linking agent can generally be included in the oil phase of the HIPE in an amount of from 0 to about 15% by weight of the monomer component.

To achieve the toughness and durability required for the current invention, the ratio of toughening monomer to crosslinker is preferred to be at least about 1:1, preferably about 2:1, and most preferably at least about 4:1.

d. Emulsifiers

Another essential component of the oil phase of the HIPE is an emulsifier component. Suitable emulsifiers are well known to those skilled in the art. Particularly preferred emulsifiers include Span 20™, Span 40™, Span 60™, and Span 80™. These are nominally esters of sorbitan derived from lauric, myristic, stearic, and oleic acids, respectively. In actuality, these contain significant portions of the di- and tri substituted esters as well as undesired isosorbide esters, polyol components, and other compounds produced during the manufacturing process. It may be preferred to remove especially the isosorbide fraction as much as possible, for example, by distillation. Other preferred emulsifiers include the diglycerol esters derived from monooleate, monomyristate, monopalmitate, and monoisostearate acids. A preferred coemulsifier is ditallowdimethyl ammonium methyl sulfate and its homologs. Other preferred emulsifiers and coemulsifiers are described in U.S. Pat. No. 5,650,222 (DesMarais et al.) issued Jul. 22, 1997, incorporated herein by reference. Mixtures of these emulsifiers are also particularly useful.

An optional secondary emulsifier(s) may be included in the emulsifier component, typically at a weight ratio of primary to secondary emulsifier of from about 50:1 to about 1:4, preferably from about 30:1 to about 2:1. As is indicated, those skilled in the art will recognize that any suitable emulsifier(s) can be used in the processes for making the foams of the present invention.

The oil phase used to form the HIPEs comprises from about 85 to about 98% by weight monomer component and from about 2 to about 15% by weight emulsifier component. Preferably, the oil phase will comprise from about 90 to about 97% by weight monomer component and from about 3 to about 10% by weight emulsifier component. The oil phase also can contain other optional components. One such optional component is an oil soluble polymerization initiator of the general type well known to those skilled in the art, such as described in U.S. Pat. No. 5,290,820 (Bass et al.), issued Mar. 1, 1994, which is incorporated by reference and WO 97/44368 (Willkomm and Hinze) filed May 23, 1996, which is incorporated herein by reference.

e. Optional Components

The oil phase may contain optional components. Such optional components include antioxidants, particularly of the type classified as a Hindered Amine Light Stabilizer (HALS), or a Hindered Phenolic Stabilizer (HPS). Such antioxidants may be applied during any convenient step in the processing. Another optional component is a plasticizer such as dioctyl azelate, dioctyl sebacate or dioctyl adipate.

Yet another of the optional ingredients are filler particles which may toughen the polymer and/or increase its thermal insulating properties. Example filler particules include aluminum, titanium dioxide, carbon black (added as very fine, insoluble particles), graphite, calcium carbonate, talc, insoluble, crosslinked flame retardant polymers, and the like. Other optional components include colorants (dyes or pigments), perfumes, chelants such as Zeolites, fluorescent agents, opacifying agents, chain transfer agents, and the like. Such additives are typically added at fairly low levels when present (e.g., less than 5%) and need not be soluble in the oil phase but may be suspended by agitation therein.

2. Water Phase Components

The discontinuous water internal phase of the HIPE is generally an aqueous solution containing one or more dissolved components. One essential dissolved component of the water phase is a water-soluble electrolyte. The dissolved electrolyte minimizes the tendency of monomers, comonomers, and crosslinkers that are primarily oil soluble to also dissolve in the water phase. This, in turn, is believed to minimize the extent to which polymeric material fills the cell windows at the oil/water interfaces formed by the water phase droplets during polymerization. Thus, the presence of electrolyte and the resulting ionic strength of the water phase is believed to determine whether and to what degree the resulting preferred polymeric foams can be open-celled.

Any electrolyte capable of imparting ionic strength to the water phase can be used. Preferred electrolytes are mono-, di-, or trivalent inorganic salts such as the water-soluble halides, e.g., chlorides, nitrates and sulfates of alkali metals and alkaline earth metals. Examples include sodium chloride, calcium chloride, sodium sulfate and magnesium sulfate. Calcium chloride is the most preferred for use in preparing the HIPEs. Generally the electrolyte will be utilized in the water phase of the HIPEs in a concentration in the range of from about 0.1 to about 20%, by weight of the water phase. More preferably, the electrolyte will comprise from about 1 to about 10%, by weight of the water phase.

The HIPEs will also typically contain an effective amount of a polymerization initiator. Such an initiator component is generally added to the water phase of the HIPEs and can be any conventional water-soluble free radical initiator. These include peroxygen compounds such as sodium, potassium and ammonium persulfates, hydrogen peroxide, sodium peracetate, sodium percarbonate and the like. Conventional redox initiator systems can also be used. Such systems are formed by combining the foregoing peroxygen compounds with reducing agents such as sodium bisulfite, L-ascorbic acid or ferrous salts.

The initiator can be present at up to about 20 mole percent based on the total moles of polymerizable monomers present in the oil phase. More preferably, the initiator is present in an amount of from about 0.001 to about 10 mole percent based on the total moles of polymerizable monomers in the oil phase.

3. Hydrophilizing Surfactants and Hydratable Salts

The polymer forming the HIPE foam structure will preferably be substantially free of polar functional groups. This means the polymeric foam will be relatively hydrophobic in character. Removal of the residual emulsifier and/or salt following polymerization can be effected as needed by any means including those described in U.S. Pat. No. 5,633,291. Alternatively, the foam may be washed with an aqueous solution of sodium bicarbonate, which converts residual calcium chloride to the insoluble calcium bicarbonate, which generally greatly reduces the water affinity of the foam.

B. Processing Conditions for Obtaining HIPE Foams

Foam preparation typically involves the steps of: 1) forming a stable high internal phase emulsion (HIPE); 2) polymerizing/curing this stable emulsion under conditions suitable for forming a solid polymeric foam structure; 3) optionally washing the solid polymeric foam structure to remove the original residual water phase, emulsifier, and salts from the polymeric foam structure; 4) thereafter dewatering this polymeric foam structure; and 5) optionally hydrophilizing the foam.

C. Formation of HIPE

The following illustrates a method of preparation of the HIPE foams for use herein.

1. Emulsion Preparation

Anhydrous calcium chloride (36.32 kg) and potassium persulfate (189 g) are dissolved in 378 L of water. This provides the water phase stream to be used in a continuous process for forming the emulsion. The oil phase is prepared by mixing the monomers chosen in the desired proportions, as noted in Table 1 infra.

Separate streams of the oil phase (25° C.) and water phase (30–90° C.) are fed to a dynamic mixing apparatus at a combined rate of about 9.1 kg per minute. Thorough mixing of the combined streams in the dynamic mixing apparatus is achieved by means of a pin impeller. The pin impeller comprises a cylindrical shaft of about 36.8 cm in length with a diameter of about 2.5 cm. The shaft holds 6 rows of pins, 3 rows having 33 pins and 3 rows having 32 pins, each having a diameter of 0.5 cm extending outwardly from the central axis of the shaft to a length of 2.5 cm. The pin impeller is mounted in a cylindrical sleeve which forms the dynamic mixing apparatus, and the pins have a clearance of 1.5 mm from the walls of the cylindrical sleeve.

A minor portion of the effluent exiting the dynamic mixing apparatus is withdrawn and enters a recirculation zone (see PCT U.S. 96/00082 published Jul. 18, 1996 and EPO 96/905110.1 filed Jan. 11, 1996). The Waukesha pump in the recirculation zone returns the minor portion to the entry point of the oil and water phase flow streams to the dynamic mixing zone. The combined mixing and recirculation apparatus set-up is filled with oil phase and water phase at a ratio of 4 parts water to 1 part oil. The dynamic mixing apparatus is vented to allow air to escape while filling the apparatus completely. The flow rates during filling are 7.6 g/sec oil phase and 30.3 cc/sec water phase. These flow rates are modified as the emulsion is formed to achieve the water-to-oil ratio desired.

Once the apparatus set-up is filled the vent is closed. Agitation is then begun in the dynamic mixer, with the impeller turning at the desired rate (e.g., 300 RPM) and recirculation is begun at a rate of about 30 cc/sec. The flow rate of the water phase is then steadily increased to a rate of 65 cc/sec over a time period of about 1 min., and the oil phase flow rate is reduced to 5 g/sec over a time period of about 3 min., or as needed to obtain the water:oil ratio desired. The recirculation rate is steadily increased to about 150 cc/sec during the latter time period. The back pressure created by the dynamic mixer and static mixing zone (TAH Industries Model Number 101-212) at this point is about 1 PSI (7 kPa), which represents the total back pressure of the system. The Waukesha pump speed is then steadily decreased to a yield a recirculation rate of about 75 cc/sec.

2. Polymerization of Emulsion

The HIPE flowing from the static mixer at this point is collected in a round polyethylene tub, 102 cm in diameter and 31.8 cm high, with removable sides, much like a springform pan used in cooking cakes. A pipe-like polyethylene insert 31.8 cm in diameter at its base is firmly affixed to the center of the base and is 31.8 cm high. The HIPE-containing tubs are kept in a room maintained at 65° C. for about 18 hours to effect polymerization and form the foam.

3. Foam Washing and Dewatering

The cured polymeric foam is removed from the curing tubs. The foam at this point has residual water phase (containing dissolved emulsifiers, electrolyte, initiator residues, and initiator) about 12–30 times (12–30×) the weight of polymerized monomers. The foam is sliced with a sharp reciprocating saw blade into sheets which are 1–5 mm in thickness. These sheets are then subjected to compression in a series of 2 porous nip rolls equipped with vacuum which gradually reduce the residual water phase content of the foam to about 6 times (6×) the weight of the polymerized material. At this point, the sheets are then resaturated with an aqueous solution of 1% Pegosperse 200 ML and 0.5% $CaCl_2$ solution at 60° C. and squeezed in a series of 3 porous nip rolls equipped with vacuum to a water phase content of about 2×. The $CaCl_2$ content of the foam is between about 0.5 and 2%.

The foam is then dried in heating tunnel to reduce the moisture content to about 9% to about 17 % by weight of polymerized material. At this point, the foam sheets are very flexible.

The following Examples further illustrate the mats of the present invention, but are not intended to be limiting thereof.

EXAMPLE I

Table 1 lists the compositions of five polymeric foams according to the present invention, and one conventional HIPE polymeric foam that was used as the reference material.

TABLE 1

| Components | REF | 1 | 2 | 3 | 4 | 5 |
| --- | --- | --- | --- | --- | --- | --- |
| Oil Phase | | | | | | |
| Ethyl Styrene | 19% | 8.9% | 11% | 11.6% | 11.6% | 8.7% |
| Styrene | 0% | 26.7% | 20% | 20% | 25% | 30% |
| Divinylbenzene (100%) | 14% | 6.4% | 9% | 8.4% | 8.4% | 6.3% |
| 2-Ethyl-Hexyl Acrylate | 55% | 58% | 55% | 55% | 50% | 55% |
| 1,6-Hexanediol Diacrylate | 12% | 0% | 5% | 5% | 5% | 0% |
| Emulsifier | 7% | 4% | 5% | 5% | 5% | 5% |
| Aqueous Phase | | | | | | |
| $CaCl_2$ | 10% | 4% | 4% | 4% | 4% | 4% |
| $K_2S_2O_8$ | 0.05% | 0.05% | 0.05% | 0.05% | 0.05% | 0.05% |
| Key Making Parameters | | | | | | |
| Water:Oil Ratio | 60:1 | 13:1 | 25:1 | 25:1 | 30:1 | 20:1 |
| Mixer RPM | 1500 | 300 | 300 | 300 | 300 | 300 |
| Emulsion Pour T (° C.) | 45° | 45° | 45° | 55° | 65° | 55° |
| Emulsion Pour Rate (kg/min) | 9.1 | 4 | 6 | 6 | 8 | 6 |
| Toughening monomer | 19% | 35.6% | 31% | 31.6% | 36.6% | 6.1% |
| Tough monomer/Crosslink monomer | .73 | 5.6 | 2.2 | 2.4 | 2.7 | 3.2 |
| Cell Size ($\mu$m) | 15 | 120 | 120 | 120 | 120 | 120 |
| Tg (° C.) | 18° | 15° | 30° | 27° | 36° | 23° |

All of the foams 1–5 of Example I are significantly more durable and resistant to abrasion relative to the reference foam.

EXAMPLE II

The foam from Table I Number 1 is cut to a thickness of 2 mm and treated with Pegosperse 200 ML as described hereinabove and dried. Laminate together 1 ml thick polypropylene/ethylenevinyl acetate ("PP/EVA") (Clopay P18-3161) and the following double side adhesive film: 1 ml thick Heartland H160 full coat/0.5 ml thick polyethylene terephthalate/0.7 Heartland H 160 pattern coat. Cut the polymeric foam into sheets. Cut the PP/EVA/adhesive film laminate into sheets.. Laminate together the foam and the PP/EVA/adhesive film laminate. Heat the structure to 140° F. for 10 minutes to allow adhesive to flow and increase bond strength. Cut the structures with a rule die according to the desired sizes of the mats to be formed, e.g., 4"×4", 11"×11", 12"×12", 24"×36", 15"×19", 36"×60", etc. Seam together with 3M fabric tape or 3M medical paper tape large mats with widths of greater than 15". Screen print the top surface of the mat with a pattern for aesthetic reasons (and to identify it as the surface to be exposed). (The pattern may include written instructions, for example. The pattern may also include puzzles, tic-tac-toe diagrams, connect-the-dots drawings, and the like, to facilitate use in restaurants and/or in homes with smaller children, for example, for the purpose of providing a protective place mat beneath plates or bowls in which a meal is served.) The mat is then ready for use in any of the places and for any of the functions described in more detail hereinabove.

EXAMPLE III

A mat similar to that described in Example II supra is cut to the shape of the tray in the door of a refrigerator and placed therein. On top of this mat is placed, for example, a gallon jug of milk or orange juice. The mat absorbs condensate and leakage from the jugs and protects the tray surface of the refrigerator. Similarly, the mat may be cut to fit as needed, refrigerator compartments, shelves, cubbyholes, and the like. When the mat becomes sufficiently fouled with exudate from foods and beverages, it can be removed and replaced.

EXAMPLE IV

A large mat similar to that in Example II supra is placed on the ground around any of the following commercial operations: operating rooms during surgery to trap blood and other fluids which may otherwise cause slipping; in doctors offices in examination rooms on floors and on examining beds; on the floor of auto repair garages, to collect gasoline and diesel fuel, transmission fluid, motor oil, differential fluid, engine coolant, and the like to prevent slippage and prevent runoff of pollutants into the environment; outside showers at health clubs and schools to prevent tracking of water around the facility; in industrial facilities to scavenge dirt, dust, oil, debris, water, and the like and maintain hygiene and protect against slippery areas; on ships around mechanical equipment, for example, on aircraft carriers on the hangar deck where aircraft servicing can lead to fuel spills; in restaurants on floors and food preparation areas, for example to collect spattered grease and oils and food exudates. The mat protects the ground underneath it from unwanted liquids which may cause slippery surfaces, accidents, and unsanitary conditions.

EXAMPLE V

Mats similar to those described in Example II supra are placed around homes and offices, for example, on the floors in front of exits to collect mud, dirt, and the like; around locations frequented by pets to collect cat litter, pet hair, pet food, watering bowls, and the like; on food preparation areas to collect fluids expressed, for example, during meat thawing and/or microwave cooking, which can cross-contaminate other foods and lead to messes; on baby changing tables; at the bottom of trash cans; around bath room sinks, showers, commodes, around laundry areas, on furniture; on top of the mattress pad to serve as absorbent layer for incontinent sleepers including infants, inside shoes and boots. The mats protect the surfaces underneath them from unwanted liquids and/or moisture which may cause slippery surfaces, soiled surfaces, unpleasant odors, accidents, and unsanitary conditions.

EXAMPLE VI

The formulation described in Example I number 5 is modified to replace 2-ethylhexyl acrylate with 2,3-dibromoacrylate to form a flame retardant exemplification of the foam layer to be used in any of the above applications. The washing treatment for such a material may include alternate salts such as are described in copending application U.S. Ser. No. 09/118,613 (Dyer) filed Jul. 17, 1998, now issued as U.S. Pat. No. 6,160,028.

EXAMPLE VII

A mat similar to that in Example II is prepared using two different foam layers. The upper layer comprises a foam which is prepared from the composition described in Example I number 5 prepared using a pin mixer impeller speed of 300 RPM to produce relatively large cells in the resulting foam. This is placed above a second layer prepared from the composition described in Example I number 2 which is prepared using a pin mixer impeller speed of 1500 RPM to produce relatively smaller cells in the resulting foam. This lower foam layer is then secured to the impermeable layer of polyethylene sheeting. This provides for a mat which will acquire fluid rapidly into the upper layer and which will then significantly partition into the lower layer as long as it has unfilled capacity, thus leaving the upper layer relatively dry to the touch.

EXAMPLE VIII

A mat is prepared from an oil phase comprising 50% isoprene, 20% styrene, 15% 1,6-hexanedioldiacrylate, and 15% methyl methacrylate using 3% additional diglycerol monooleate (DGMO) and an aqueous phase comprising 4% calcium chloride and 0.15% potassium persulfate. The emulsion is formed as in previous examples but at 25° C. and collected in a tub capable of withstanding internal pressurization. The tub is pressurized using nitrogen to a pressure of 2 atmospheres and placed in a 65° C. oven for 2 days. The resulting foam is processed as usual. During the processing, the foam is washed with an aqueous solution adjusted to pH 4.5 and containing 0.5% Pegosperse 200ML, 0.5% calcium chloride, and 0.1% Chimassorb 944 (a product of Ciba Specialty Chemicals). The foam is dewatered and is dried conventionally. The resulting foam sheet is substantially biodegradable while also being tough and flexible. In yet another example, the same formulation is modified to include chloroprene in place of isoprene to further confer fire retardancy.

What is claimed is:

1. A flexible mat for absorbing liquids for use on floors and other surfaces, the mat comprising:
a) a waterproof component;
b) a polymeric foam sheet having a front side and a back side wherein the waterproof component is attached to the back side such that the back side is liquid impervious, and the polymeric foam sheet comprises a polymerized water-in-oil emulsion having:
 1) an oil phase comprising:
  a) from about 85 to about 98% by weight of a monomer component, said monomer component comprising:
   i) from about 45% to about 70%, by weight of the monomer component, of a substantially water-insoluble, monofunctional monomer capable of forming a homopolymer having a Tg of about 25° C. or less;
   ii) from about 25% to about 45%, by weight of the monomer component, of a substantially water-insoluble, monofunctional comonomer capable of imparting toughness about equivalent to that provided by styrene;
   iii) from about 3% to about 25%, by weight of the monomer component, of a first substantially water-insoluble, polyfunctional crosslinking agent selected from the group consisting of divinylbenzenes, trivinylbenzenes, divinyltoluenes, divinylxylenes, divinylnaphthalenes, divinylalkylbenzenes, divinylphenanthrenes, divinylbiphenyls, divinyldiphenylmethanes, divinylbenzyls, divinylphenylethers, divinyldiphenylsulfides, divinylfurans, divinylsulfide, divinylsulfone, and mixtures thereof; and
   iv) from 0 to about 15%, by weight of the monomer component, of a second substantially water-insoluble, polyfunctional crosslinking agent selected from the group consisting of polyfunctional acrylates, methacrylates, acrylamides, methacrylamides, and mixtures thereof;
   v) wherein the weight ratio of the monofunctional comonomer capable of imparting toughness (ii) to the sum of the first and second polyfunctional crosslinking agents (iii+iv) is at least about 1:1;
 b) from about 2% to about 15%, by weight of the oil phase, of an emulsifier component which is soluble in the oil phase and which is suitable for forming a stable water-in-oil emulsion; and
 2) a water phase comprising from about 0.1% to about 20% by weight of a water-soluble electrolyte; and
 3) a volume to weight ratio of water phase to oil phase of at least about 12:1;
wherein said sheet has a thickness between about 1.5 mm and about 5 mm.

2. The polymeric foam sheet of claim 1 wherein the weight ratio of the monofunctional comonomer capable of imparting toughness (ii) to the sum of the first and second polyfunctional crosslinking agents (iii+iv) is at least about 2:1.

3. The polymeric foam sheet of claim 1 wherein the weight ratio of the monofinctional comonomer capable of imparting toughness (ii) to the sum of the first and second polyfunctional crosslinking agents (iii+iv) is at least about 3:1.

4. The polymeric foam sheet of claim 1 wherein the weight ratio of the monofunctional comonomer capable of imparting toughness (ii) to the sum of the first and second polyfunctional crosslinking agents (iii+iv) is at least about 5:1.

5. The polymeric foam sheet of claim 1 wherein the oil phase of the emulsion comprises from about 30% to about 40% of the monofunctional comonomer capable of imparting toughness about equivalent to that provided by styrene.

6. The mat of claim 1 wherein the waterproof component is a waterproof composition which is coated on the back side of the polymeric foam sheet.

7. The mat of claim 1 wherein the waterproof component is in the form of a waterproof sheet which is attached to the back side of the polymeric foam sheet.

8. The mat of claim 1 wherein the mat has a size selected from the group consisting of 5"×5", 8"×10", 11"×11", 15"×19", 24"×36", and 36"×60".

9. The mat of claim 8 used as a floor mat to absorb hydrophilic liquids.

10. The mat of claim 8 used on kitchen surfaces to absorb hydrophilic liquids.

11. The mat of claim 8 used in a garage to absorb hydrophobic liquids.

12. The mat of claim 1 wherein the waterproof component further comprises a skid resistant material.

13. A flexible mat for absorbing liquids for use on floors and other surfaces, the mat comprising:
a) a waterproof component;
b) at least one liquid pervious sheet;
c) a polymeric foam sheet having a front side and a back side wherein the waterproof component is attached to the back side such that the back side is liquid impervious, and the polymeric foam sheet comprises a polymerized water-in-oil emulsion having:
1) an oil phase comprising:
a) from about 85 to about 98% by weight of a monomer component, said monomer component comprising:
i) from about 45% to about 70%, by weight of the monomer component, of a substantially water-insoluble, monofunctional monomer capable of forming a homopolymer having a Tg of about 25° C. or less;
ii) from about 25% to about 45%, by weight of the monomer component, of a substantially water-insoluble, monofunctional comonomer capable of imparting toughness about equivalent to that provided by styrene;
iii) from about 3% to about 25%, by weight of the monomer component, of a first substantially water-insoluble, polyfunctional crosslinking agent selected from the group consisting of divinylbenzenes, trivinylbenzenes, divinyltoluenes, divinylxylenes, divinylnaphthalenes divinylalkylbenzenes, divinylphenanthrenes, divinylbiphenyls, divinyldiphenylmethanes, divinylbenzyls, divinylphenylethers, divinyldiphenylsulfides, divinylfurans, divinylsulfide, divinylsulfone, and mixtures thereof; and
iv) from 0 to about 15%, by weight of the monomer component, of a second substantially water-insoluble, polyfunctional crosslinking agent selected from the group consisting of polyfunctional acrylates, methacrylates, acrylamides, methacrylamides, and mixtures thereof;
v) wherein the weight ratio of the monofunctional comonomer capable of imparting toughness (ii) to the sum of the first and second polyfunctional crosslinking agents (iii+iv) is at least about 1:1;
b) from about 2% to about 15%, by weight of the oil phase, of an emulsifier component which is soluble in the oil phase and which is suitable for forming a stable water-in-oil emulsion; and
2) a water phase comprising from about 0.1% to about 20% by weight of a wate-soluble electrolyte; and
3) a volume to weight ratio of water phase to oil phase of at least about 12:1;
wherein said sheet has a thickness between about 1.5 mm and about 5 mm.

14. The polymeric foam sheet of claim 13 wherein the weight ratio of the monofunctional comonomer capable of imparting toughness (ii) to the sum of the first and second polyfunctional crosslinking agents (iii+iv) is at least about 2:1.

15. The polymeric foam sheet of claim 13 wherein the weight ratio of the monofunctional comonomer capable of imparting toughness (ii) to the sum of the first and second polyfunctional crosslinking agents (iii+iv) is at least about 3:1.

16. The polymeric foam sheet of claim 13 wherein the weight ratio of the monofunctional comonomer capable of imparting toughness (ii) to the sum of the first and second polyfunctional crosslinking agents (iii+iv) is at least about 5:1.

17. The polymeric foam sheet of claim 13 wherein the oil phase of the emulsion comprises from about 30% to about 40% of the monofunctional comonomer capable of imparting toughness about equivalent to that provided by styrene.

18. The mat of claim 13 wherein the mat has a size selected from the group consisting of 5"×5", 8"×10", 11"×11", 15"×19", 24"×36", and 36"×60".

19. The mat of claim 13 wherein the liquid pervious sheet is attached to the front side of the polymeric foam sheet and is selected from the group consisting of woven and non-woven materials, natural fibers, synthetic fibers, and combinations thereof.

20. The mat of claim 19 wherein the waterproof component is a waterproof composition which is coated on the back side of the polymeric foam sheet.

21. The mat of claim 19 wherein the waterproof component is in the form of a waterproof sheet which is attached to the back side of the polymeric foam sheet.

22. The mat of claim 21 wherein the waterproof component further comprises a skid resistant material.

23. The mat of claim 22 used as a floor mat to absorb hydrophilic liquids.

24. The mat of claim 22 used in a garage to absorb hydrophobic liquids.

25. The mat of claim 22 used as shoe or boot inserts.

26. A method for manufacturing a flexible mat for absorbing liquids for use on floors and other surfaces, comprising the steps of:
(A) creating a polymeric foam sheet, having a front side and a back side, by forming a water-in-oil emulsion from:
(1) an oil phase comprising:
(a) from about 85% to about 98%, by weight of the oil phase, of a monomer component comprising:
(i) from about 45% to about 70%, by weight of the monomer component, of a substantially water-insoluble, monofunctional monomer capable of forming a homopolymer having a Tg of about 25° C. or less;
(ii) from about 25% to about 45%, by weight of the monomer component, by weight of a substantially water-insoluble, monofunctional comonomer capable of imparting toughness about equivalent to that provided by styrene;
(iii) from about 3% to about 25%, by weight of the monomer component, of a first substantially water-insoluble, polyfunctional crosslinking agent selected from the group consisting of divinyl benzene and analogs thereof; and (iv) from about 0% to about 15%, by weight of the monomer component, of a second substantially water-insoluble, polyfunctional crosslinking agent selected from the group consisting of diacrylates and dimethacrylates of diols and analogs thereof; and v) wherein the weight ratio of the monofunctional comonomer capable of imparting toughness (ii) to the sum of the first and second polyfunctional crosslinking agents (iii+iv) is at least about 1:1; and (b) from about 2% to about 15%, by weight of the oil phase, of an emulsifier component which is soluble in the oil phase and which is suitable for forming a stable water-in-oil emulsion;

(2) an aqueous phase comprising from about 0.1% to about 20%, by weight of the aqueous phase, of a water-soluble electrolyte; and (3) a volume to weight ratio of aqueous phase to oil phase of at least about 12:1; and (B) polymerizing the monomer component in the oil phase of the water-in-oil emulsion to form the polymeric foam sheet wherein said sheet has a thickness between about 1.5 mm and about 5 mm; and (C) attaching a waterproof component to the back side of the polymeric foam sheet.

27. The method according to claim 26 further comprising attaching at least one liquid pervious sheet to the polymeric foam sheet.

\* \* \* \* \*

UNITED STATES PATENT AND TRADEMARK OFFICE
CERTIFICATE OF CORRECTION

PATENT NO. : 6,245,697 B1  
DATED : June 12, 2001  
INVENTOR(S) : Jonnie Pehrson Conrad et al.

It is certified that error appears in the above-identified patent and that said Letters Patent is hereby corrected as shown below:

Column 1,  
Line 37, delete "45,028,468" and insert -- 5,025,468 --.

Column 2,  
Line 10, delete "et al" and insert -- et al. --.

Column 9,  
Lines 20 and 30, detete "waterinsoluble" and insert -- water-insoluble --.  
Line 57, delete "polyrnerizable" and insert -- polymerizable --.

Column 10,  
Line 23, delete "31 40°" and insert -- -40° --.

Column 11,  
Line 28, delete "divinylfirans" and insert -- divinylfurans --.

Column 13,  
Line 23, delete "Hvdratable" and insert -- Hydratable --.

Column 18,  
Line 47, delete "monofinctional" and insert -- monofunctional --.

Column 19,  
Line 62, delete "wate-soluble" and insert -- water-soluble --.

Signed and Sealed this

Sixteenth Day of May, 2006

JON W. DUDAS  
*Director of the United States Patent and Trademark Office*